United States Patent
Geist et al.

(10) Patent No.: US 12,553,355 B2
(45) Date of Patent: Feb. 17, 2026

(54) NOZZLE RING FOR A RADIAL TURBINE, EXHAUST TURBINE, AND TURBOCHARGER

(71) Applicant: Accelleron Switzerland Ltd., Baden (CH)

(72) Inventors: Nico Geist, Bernau im Schwarzwald (DE); Florian Maurer, Baden (CH); Davide Pinzi, Ehrendingen (CH)

(73) Assignee: Accelleron Switzerland Ltd., Baden (CH)

( * ) Notice: Subject to any disclaimer, the term of this patent is extended or adjusted under 35 U.S.C. 154(b) by 0 days.

(21) Appl. No.: 18/848,330

(22) PCT Filed: Mar. 8, 2023

(86) PCT No.: PCT/EP2023/055884
§ 371 (c)(1),
(2) Date: Sep. 18, 2024

(87) PCT Pub. No.: WO2023/180071
PCT Pub. Date: Sep. 28, 2023

(65) Prior Publication Data
US 2025/0198296 A1 Jun. 19, 2025

(30) Foreign Application Priority Data

Mar. 22, 2022 (EP) .................................... 22163576

(51) Int. Cl.
*F01D 9/04* (2006.01)
*F01D 17/16* (2006.01)
(Continued)

(52) U.S. Cl.
CPC ........... *F01D 9/045* (2013.01); *F01D 17/165* (2013.01); *F01D 17/16* (2013.01); *F01D 25/246* (2013.01);
(Continued)

(58) Field of Classification Search
CPC ........ F04D 17/165; F04D 17/16; F02B 37/24; F02C 6/12; F01D 9/045; F01D 25/246
See application file for complete search history.

(56) References Cited

U.S. PATENT DOCUMENTS 3,112,096 A * 11/1963 Lazo ........................ F02C 6/12
                                                                  415/135
3,460,806 A * 8/1969 Vershure, Jr. ........... F01D 9/045
                                                                  415/139
(Continued)

FOREIGN PATENT DOCUMENTS

DE         19703033 A1    7/1998
DE     102011108195 A1    1/2013
(Continued)

OTHER PUBLICATIONS

International Search Report for PCT/EP2023/055884 mailed Jun. 6, 2023, 5 pgs.
(Continued)

*Primary Examiner* — Courtney D Heinle
*Assistant Examiner* — Behnoush Haghighian
(74) *Attorney, Agent, or Firm* — Meunier Carlin & Curfman LLC

(57) ABSTRACT

The invention relates to a nozzle ring for a radial turbine. The nozzle ring comprises a first ring element, a second ring element, and a plurality of guide vanes arranged between the first ring element and the second ring element. The second ring element comprises an end region, which extends inwards exclusively in the radial direction and has a convex curvature on a side facing the first ring element. The invention also relates to an exhaust turbine and to a turbocharger.

18 Claims, 3 Drawing Sheets

(51) Int. Cl.
*F01D 25/24* (2006.01)
*F02B 37/24* (2006.01)
*F02C 6/12* (2006.01)

(52) U.S. Cl.
CPC .............. *F02B 37/24* (2013.01); *F02C 6/12* (2013.01); *F05D 2220/40* (2013.01); *F05D 2240/128* (2013.01); *F05D 2240/59* (2013.01); *F05D 2250/711* (2013.01)

(56) References Cited

U.S. PATENT DOCUMENTS

| | | | | |
|---|---|---|---|---|
| 5,947,681 | A * | 9/1999 | Rochford | F01D 17/165 415/164 |
| 5,964,574 | A * | 10/1999 | Meier | F01D 9/048 415/110 |
| 6,145,313 | A * | 11/2000 | Arnold | F02B 37/00 60/605.2 |
| 7,351,042 | B2 * | 4/2008 | Jinnai | F01D 17/165 415/164 |
| 8,517,673 | B2 * | 8/2013 | Ambrosy | F16J 15/3292 415/230 |
| 8,979,485 | B2 * | 3/2015 | Baker | F01D 17/14 415/158 |
| 9,074,687 | B2 * | 7/2015 | Matsuyama | F16J 15/0887 |
| 9,784,119 | B2 * | 10/2017 | Tashiro | F01D 17/165 |
| 9,988,939 | B2 * | 6/2018 | Ishii | F01D 25/24 |
| 10,801,405 | B2 * | 10/2020 | Asakawa | F02B 37/24 |
| 10,934,867 | B2 * | 3/2021 | Takeda | F04D 29/444 |
| 11,118,508 | B2 * | 9/2021 | Asakawa | F02B 37/24 |
| 11,828,222 | B2 * | 11/2023 | Sambhav | F01D 25/24 |
| 2010/0247309 | A1 * | 9/2010 | Ambrosy | F01D 11/001 415/230 |
| 2012/0263585 | A1 * | 10/2012 | Matsuyama | F02B 37/00 415/204 |
| 2013/0170975 | A1 * | 7/2013 | Ishii | F01D 9/045 415/208.1 |
| 2014/0099191 | A1 * | 4/2014 | Kotzbacher | F02B 37/24 415/151 |
| 2014/0322005 | A1 * | 10/2014 | Ihli | F01D 9/045 415/208.1 |
| 2015/0260288 | A1 * | 9/2015 | Matsuyama | F16J 15/0887 415/110 |
| 2019/0024517 | A1 * | 1/2019 | Takeda | F01D 9/026 |
| 2019/0153943 | A1 * | 5/2019 | Asakawa | F01D 17/165 |
| 2020/0300162 | A1 * | 9/2020 | Asakawa | F01D 17/16 |
| 2022/0205382 | A1 * | 6/2022 | Sambhav | F01D 17/165 |

FOREIGN PATENT DOCUMENTS

| | | |
|---|---|---|
| DE | 112017004220 T5 | 5/2019 |
| JP | 2009243375 A | 10/2009 |
| JP | 2011-157841 | 1/2014 |
| WO | 2017/126038 A1 | 7/2017 |

OTHER PUBLICATIONS

Written Opinion for PCT/EP2023/055884, mailed Jun. 6, 2023, 8 pgs.
European Search Report for EP Application No. 22163576.6, dated Oct. 7, 2022, 5 pgs.
Office Action in connection to Japanese Patent Application No. 2024-556160, dated Nov. 26, 2025.

* cited by examiner

NOZZLE RING FOR A RADIAL TURBINE, EXHAUST TURBINE, AND TURBOCHARGER

CROSS REFERENCE TO RELATED APPLICATIONS

This application is a United States National Phase Patent Application of International Patent Application Number PCT/EP2023/055884, filed on Mar. 8, 2023, which claims the benefit of and priority to EP Application Serial No. 22163576.6, filed Mar. 22, 2022.

TECHNICAL FIELD

The invention relates to the field of turbochargers comprising an exhaust turbine, in particular a radial turbine. In particular, the invention relates to a nozzle ring for a radial turbine.

TECHNICAL BACKGROUND

In order to increase the performance of an internal combustion engine, turbochargers comprising a turbine in the exhaust system of the internal combustion engine and comprising a compressor upstream of the internal combustion engine are used as standard nowadays. In this arrangement, the exhaust gases of the internal combustion engine are depressurized in the turbine. The performance obtained in so doing is transmitted to the compressor by means of a shaft, which compressor compresses the air supplied to the internal combustion engine. By using the energy of the exhaust gases to compress the air supplied to the combustion process in the internal combustion engine, the combustion process and the degree of effectiveness of the internal combustion engine can be optimized.

The kinetic and thermal energy of the exhaust gas is used to drive the rotor of the turbocharger. In order to be able to ensure safe operation, the exhaust gas stream must be guided onto the turbine shaft in a targeted manner. For this purpose, and to allow a thermodynamic adaptation of the turbocharger for different applications, in the case of radial turbine stages at the outlet of the flow duct, a nozzle ring is installed upstream of the turbine shaft. The exhaust gas is supplied through the nozzle ring of the turbine which is connected upstream of the turbine. The nozzle ring vane arrangement influences the characteristics of the turbocharger. Different nozzle rings are used for different applications.

The turbine or gas inlet housings are conventionally cast parts which are produced in the sand casting process. In this process, the flow duct in the housing interior is represented by means of what is known as a core in the casting mold. This core is connected to the outer contour of the casting mold. This connection is referred to as what is known as a core gap. In the component, the core gap is located in the position in which the nozzle ring is arranged in the turbocharger. For technical reasons, the core gap must have a minimum cross section in order to ensure sufficient stability of the connection to the outer mold.

It has been found that, in the case of small turbine blades (trim) in the region between the nozzle ring and the turbine wheel (=core gap region of the casting mold) a flow contour is required which cannot be produced from the available blank, since the blank does not provide enough material. For reasons relating to casting, it is not possible to adapt the blank, since such an adaptation would reduce the core gap to a cross section which could no longer be used to produce the housing.

The object of the present invention consists in providing a solution to the above-mentioned problem.

BRIEF DESCRIPTION OF THE INVENTION

In order to solve the above-mentioned problems, a nozzle ring and an exhaust turbine as claimed in the independent claims are provided. Furthermore, a turbocharger comprising an exhaust turbine according to the embodiments described herein is provided. Further aspects, advantages and features of the present invention can be found in the dependent claims, the description and the accompanying drawings.

According to one aspect of the invention, a nozzle ring for a radial turbine is provided. The nozzle ring comprises a first annular element, a second annular element, and a plurality of guide vanes which are arranged between the first annular element and the second annular element. The second annular element comprises an end region extending solely inward in the radial direction, which region has a convex curvature on a side facing the first annular element.

Advantageously, a nozzle ring is thus provided by means of which the manufacturing-related disadvantages, which are mentioned at the outset, in the process of casting the housing can be overcome at least in part or even in full. In particular, a nozzle ring is advantageously provided by means of which material missing from the turbine housing as a result of manufacturing-related limitations can be substituted or bridged. In particular, the second annular element of the nozzle ring is advantageously configured in such a way that casting-related disadvantages and limitations for producing radial turbines having small turbine blades can be overcome, and improvements in terms of flow can be achieved.

A second aspect of the invention relates to an exhaust turbine, in particular to a radial turbine. The exhaust turbine comprises a turbine housing having a gas inlet housing, a radial gas inflow duct arranged in the gas inlet housing, and a nozzle ring which is arranged in the radial gas inflow duct. The nozzle ring comprises a first annular element, a second annular element, and a plurality of guide vanes which are arranged between the first annular element and the second annular element. The second annular element comprises an end region extending solely inward in the radial direction, which region has a convex curvature on a side facing the first annular element. In particular, the convex curvature extends as far as the radially inner end of the second annular element. There is an axial gap between a side of the second annular element which faces away from the first annular element and an opposite side of the gas inlet housing.

Advantageously, an exhaust turbine is thus provided which is improved with respect to the prior art. In particular, an exhaust turbine is provided by means of which the manufacturing-related disadvantages, which are mentioned at the outset, in the process of casting the housing can be overcome at least in part or even in full.

A third aspect of the invention relates to a turbocharger comprising an exhaust turbine according to the embodiments described herein so that advantageously, a turbocharger is provided which is improved with respect to the prior art.

BRIEF DESCRIPTION OF THE DRAWINGS

In the following, the invention will be explained with reference to exemplary embodiments shown in the drawings, from which further advantages and modifications emerge. In the drawings.

DETAILED DESCRIPTION OF THE DRAWINGS

Figure 1:
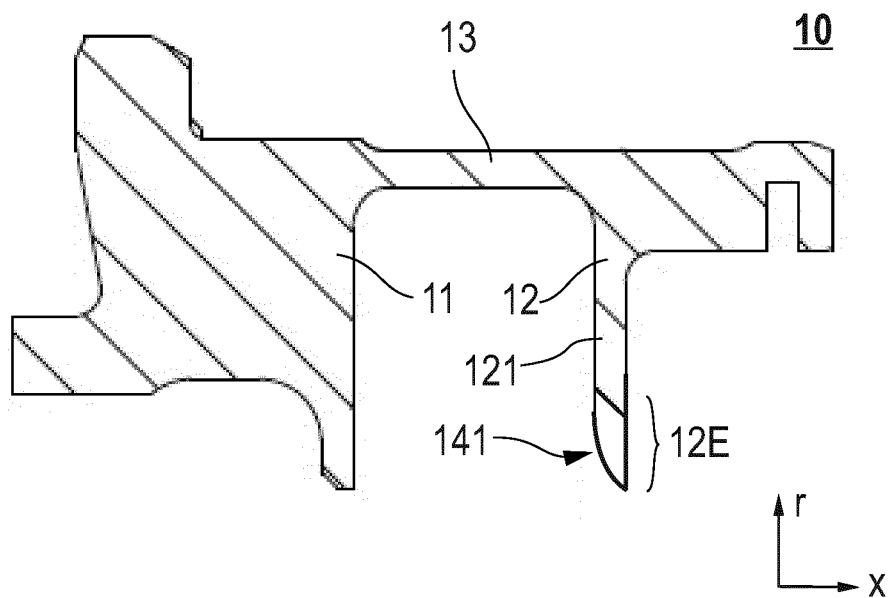
FIG. 1 is a schematic sectional view of a nozzle ring according to embodiments described herein.

In the following, various embodiments are described, of which one or more examples are shown in each drawing. Each example is used for the purpose of explanation and is not to be understood as a restriction. For example, features which are shown or described as part of an embodiment can be used on or in combination with each different embodiment in order to obtain another embodiment. The present disclosure is intended to include such modifications and variations.

In the following description of the drawings, the same reference numerals relate to the same or like components. In general, only the differences in relation to the individual embodiments are described. Unless indicated otherwise, the description of a part or aspect in one embodiment can also relate to a corresponding part or a corresponding aspect in another embodiment.

With reference to FIGS. 1 to 4, a nozzle ring 10 for a radial turbine is described according to embodiments of the present disclosure.

Figure 2:
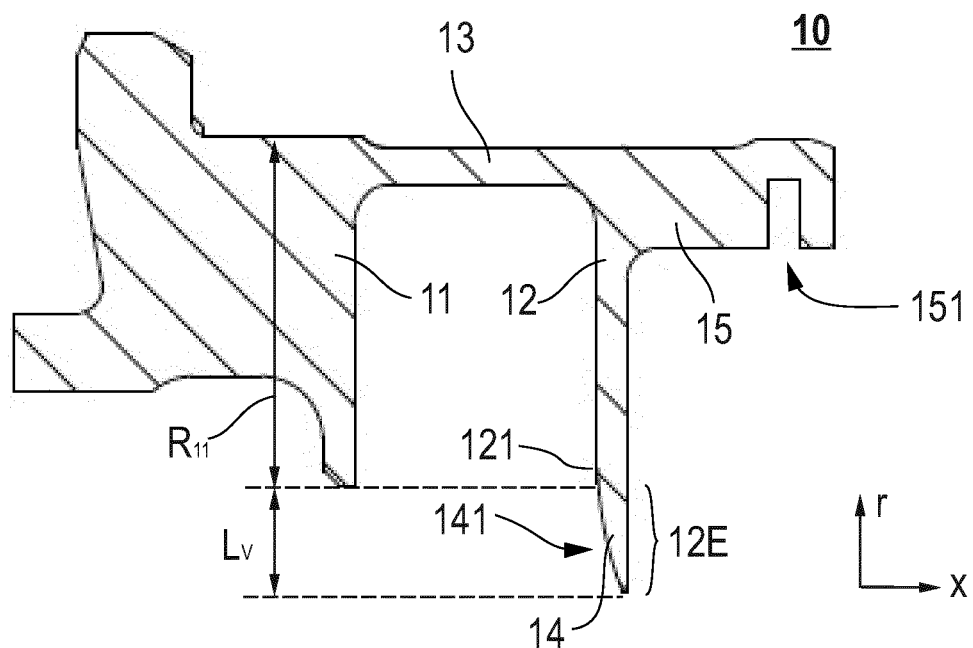
FIG. 2 is a schematic sectional view of a nozzle ring according to further embodiments described herein.
Figure 3:
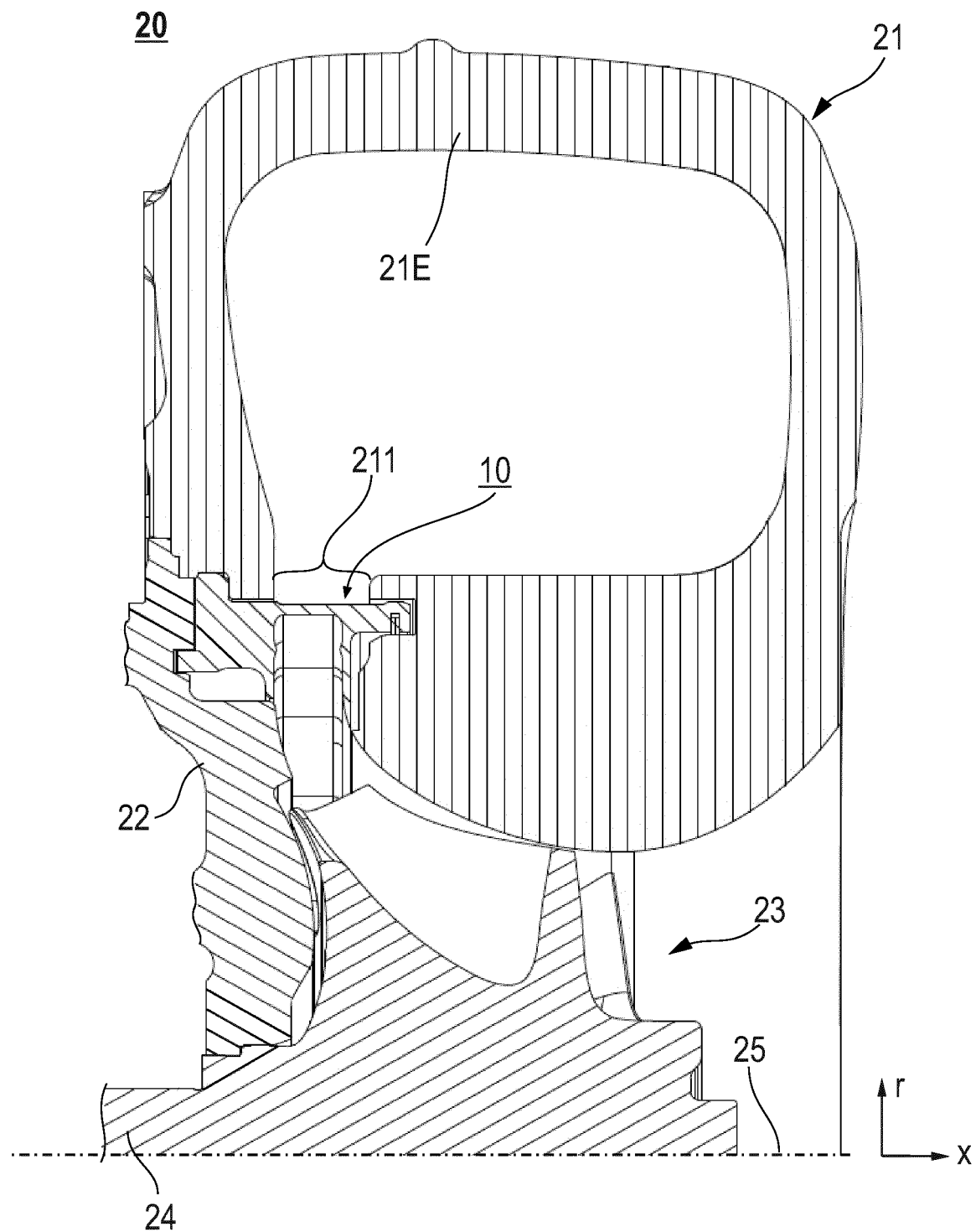
FIG. 3 is a schematic sectional view of an exhaust turbine comprising a nozzle ring according to embodiments described herein.

According to one embodiment, which can be combined with other embodiments described herein, the nozzle ring 10 comprises a first annular element 11, a second annular element 12, and a plurality of guide vanes 13, as shown by way of example in FIG. 1. The guide vanes 13 are arranged between the first annular element 11 and the second annular element 12. Typically, a flow duct 17 is located between the first annular element 11 and the second annular element 12. In other words, the intermediate space between the first annular element 11 and the second annular element 12 provides a flow duct 17. The first annular element 11 typically defines the flow duct 17 on the bearing-housing side. In FIG. 3, an exemplary embodiment of the nozzle ring 10 when installed is shown, in which the turbine housing 21 and the bearing housing 22 are shown. The second annular element 12 typically defines the flow duct 17 on the turbine-housing side. The second annular element 12 comprises an end region 12E which extends solely inward in the radial direction. The radial direction r and the axial direction x are shown in FIGS. 1 to 4 by means of corresponding arrows. As can be seen from the drawings, the end region 12E extending solely inward in the radial direction is an end region on the outflow side. The flow direction S is indicated in FIGS. 1 and 2 by an arrow. Typically, the length of the end region is less than or equal to 50% of the total radial extent of the second annular element 12. A side 121 of the radially inner end region 12E of the second annular element 12 facing the first annular element 11 has a convex curvature 141. From FIGS. 1, 2 and 3, it is clear that the side 121 facing the first annular element 11 is typically a side of the nozzle ring 10 which defines the flow duct 17. In particular, the convex curvature 141 extends as far as the radially inner end of the second annular element 12. Typically, the convex curvature 141 is curvature continuous.

Advantageously, a nozzle ring is thus provided by means of which the casting-related disadvantages, which are mentioned at the outset, in the manufacture of turbine housings can be overcome at least in part or even in full. In particular, the embodiments of the nozzle ring described herein allow material which is missing from the turbine housing as a result of manufacturing-related limitations to be substituted or bridged. In particular, the second annular element of the nozzle ring is advantageously configured in such a way that casting-related disadvantages and limitations for producing radial turbines having small turbine blades can be overcome, and improvements in terms of flow can be achieved.

According to one embodiment which can be combined with other embodiments described herein, the first annular element 11 is a support ring of the nozzle ring 10. The second annular element 12 can be a cover ring of the nozzle ring 10. In addition to the bearing-housing-side definition of the flow duct 17, the first annular element 11, in particular the support ring, can also be configured to provide a radial and/or axial positioning function for the nozzle ring. Furthermore, the first annular element 11, in particular the support ring, can be configured to provide a centering function in the turbine housing. Moreover, the first annular element 11, in particular the support ring, can be configured to provide a flow-conducting contour in the direction of the turbine wheel after the flow around the guide vanes 13.

According to one embodiment, which can be combined with other embodiments described herein, in contrast to the first annular element 11, the second annular element 12 comprises a prolongation 14 extending solely inward in the radial direction, as shown by way of example in FIG. 2. Thus, material missing from the turbine housing as a result of manufacturing-related limitations can advantageously be substituted or bridged by the prolongation 14. Advantageously, the prolongation 14 extends beyond the flow duct 17 of the nozzle ring 10. Furthermore, the prolongation 14 can advantageously be used to compensate for casting tolerances in the turbine housing in the region of the transition from turbine housing to nozzle ring. As shown by way of example in FIG. 2, the prolongation 14 typically comprises the convex curvature 141. In particular, the convex curvature 141 extends as far as the radially inner end of the prolongation 14. Improved flow guidance in the direction of the turbine wheel can thus be provided.

According to one embodiment which can be combined with other embodiments described herein, the prolongation 14 has a length $L_V$, which is at least 10% of the radial extent $R_{11}$ of the first annular element 11, as shown by way of example in FIG. 2. Alternatively, the length $L_V$ can be at least 20% of the radial extent $R_{11}$ of the first annular element 11. By way of example, the length $L_V$ can be at least 30% of the radial extent $R_{11}$ of the first annular element 11.

According to an exemplary embodiment shown in FIG. 2, which can be combined with other embodiments described herein, the second annular element 12 further comprises an axial extension 15. The axial extension 15 is configured for insertion in an axial receiving portion 212 of a gas inlet housing 21E of a turbine housing 21, as shown by way of example in FIG. 4. Typically, the axial extension 15 is arranged in a region of the second annular element 12 on the inflow side. According to one embodiment which is not shown explicitly, the axial extension 15 can be arranged in a region of the annular element 12 on the outflow side.

Figure 4:
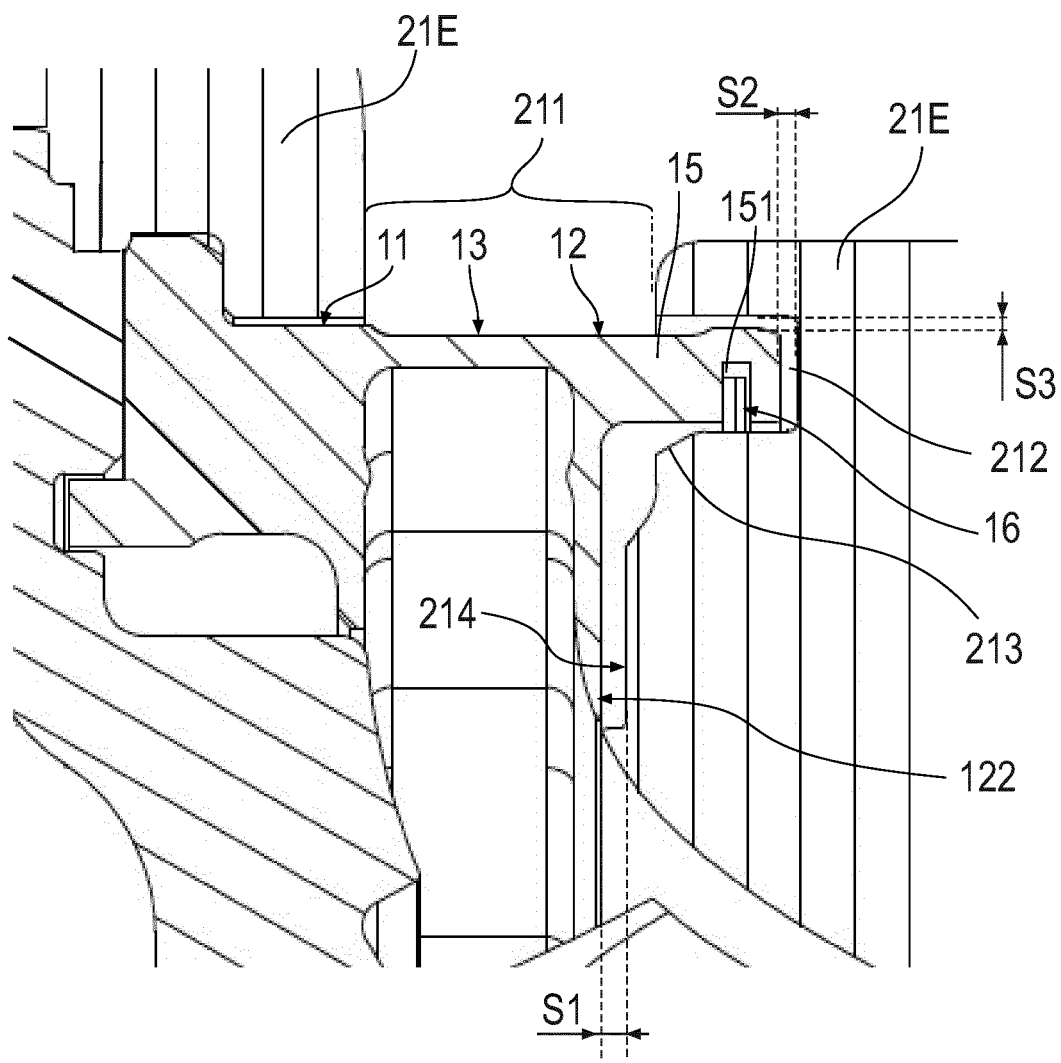
FIG. 4 shows an enlarged region of FIG. 3, in which the nozzle ring is shown installed according to embodiments described herein.

According to one embodiment which can be combined with other embodiments described herein, the axial extension 15 comprises a receiving portion 151 for a sealing element 16, as shown by way of example in FIGS. 2 and 4. Typically, the receiving portion 151 for the sealing element 16 is arranged in a radially inner region of the axial extension 15. According to one embodiment which is not shown explicitly, the receiving portion 151 for the sealing element 16 can be arranged in a radially outer region of the axial extension 15.

With reference to FIGS. 3 and 4, an exhaust turbine 20, in particular a radial turbine, is described according to embodiments of the present disclosure. According to one embodiment, which can be combined with other embodiments described herein, the exhaust turbine 20 comprises a turbine housing 21 having a gas inlet housing 21E. An exhaust turbine can be understood to be a turbine stage. In the gas inlet housing 21E, a radial gas inflow duct 211 is arranged. The exhaust turbine typically comprises a turbine wheel 23, which is arranged on a shaft 24 mounted in a bearing housing 22 and having a central axis 25 of rotation. Furthermore, the exhaust turbine 20 comprises a nozzle ring 10, which is arranged in the radial gas inflow duct 211. The nozzle ring 10 comprises a first annular element 11, a second annular element 12, and a plurality of guide vanes 13. The guide vanes 13 are arranged between the first annular element 11 and the second annular element 12. The second annular element 12 comprises an end region 12E which extends solely inward in the radial direction. The end region 12E has a convex curvature 141 on a side 121 facing the first annular element 11. In particular, the convex curvature 141 extends as far as the radially inner end of the second annular element 12. An axial gap S1 is located between a side 122 of the second annular element 12 which faces away from the first annular element 11 and an opposite side 214 of the gas inlet housing 21E.

Advantageously, an exhaust turbine is thus provided which is improved with respect to the prior art. In particular, a gas turbine is provided, by means of which the manufacturing-related disadvantages, which are mentioned at the outset, in the process of casting the housing can be overcome at least in part or even in full. In particular, an exhaust turbine is provided, by means of which casting-related disadvantages and limitations for producing radial turbines having small turbine blades can be overcome, and improvements in terms of flow can be achieved.

As described with reference to FIGS. 2 and 4, in contrast to the first annular element 11, the second annular element 12 has a prolongation 14 extending solely inward in the radial direction. Furthermore, the second annular element 12 can comprise an axial extension 15, which is arranged at least in part in an axial receiving portion 212 of the gas inlet housing 21E, as shown by way of example in FIG. 4.

According to one embodiment which can be combined with other embodiments described herein, the axial extension 15 comprises a receiving portion 151 for a sealing element 16, in which a sealing element 16 is arranged. Typically, the sealing element 16 provides a seal between nozzle ring 10 and gas inlet housing 21E. The sealing element 16 can be for example a metal lamellar sealing ring.

According to one embodiment, which can be combined with other embodiments described herein, the axial receiving portion 212 of the gas inlet housing 21E comprises a bevel 213 or a rounding, as shown by way of example in FIG. 4. Typically, the bevel or the rounding is arranged in a radially inner region of the axial receiving portion 212. Providing a bevel is advantageous for inserting the axial extension 15, together with sealing element 16, in the axial receiving portion 212 of the gas inlet housing 21E.

According to one embodiment, which can be combined with other embodiments described herein, there is an axial gap S2 between an end face of the axial extension 15 and the axial receiving portion 212 of the gas inlet housing 21E.

According to one embodiment, which can be combined with other embodiments described herein, there is a radial gap S3 between a radially outer side of the axial extension 15 and the axial receiving portion 212 of the gas inlet housing 21E.

Providing the gaps S1, S2 and S3 described herein can be in particular advantageous to minimize material stresses as a result of temperature-related material expansions, in particular of the nozzle ring.

It should be noted that the exhaust turbine 20 typically comprises a nozzle ring 10 according to one of the embodiments described herein. It should further be noted that, in light of the embodiments described herein, a turbocharger comprising an exhaust turbine according to embodiments described herein can advantageously be provided.

LIST OF REFERENCE SIGNS 10 nozzle ring
11 first annular element/support ring
12 second annular element/cover ring
121 side of the second annular element facing the first annular element
122 side of the second annular element facing away from the first annular element
13 guide vanes
14 prolongation extending inward in the radial direction
12E end region of the second annular element directed radially inward
141 convex curvature
15 axial extension
151 receiving portion for sealing element
16 sealing element
17 flow duct
20 exhaust turbine
21 turbine housing
21E gas inlet housing
211 radial gas inflow duct
212 axial receiving portion in the gas inlet housing for the axial extension
213 bevel
214 side of the gas inlet housing opposite the side of the second annular element facing away from the first annular element
22 bearing housing
23 turbine wheel
24 shaft
25 central axis of rotation
S1 axial gap between radial prolongation and gas inlet housing
S2 axial gap between axial prolongation and axial receiving portion of the gas inlet housing
S3 radial gap between axial prolongation and axial receiving portion of the gas inlet housing r radial direction
x axial direction
S flow direction
$L_V$ length of the radial prolongation of the second annular element/cover ring
$R_{11}$ radial extent of the first annular element

The invention claimed is:

1. A nozzle ring for a radial turbine, wherein the nozzle ring comprises a first annular element, a second annular element, and a plurality of guide vanes which are arranged between the first annular element and the second annular element, wherein an intermediate space between the first annular element and the second annular element provides a flow duct, wherein, when the nozzle ring is installed, the first annular element defines the flow duct on a bearing-housing side and the second annular element defines the flow duct on a turbine-housing side, wherein the second annular element comprises an axial extension that extends axially parallel to a central axis of rotation of the radial turbine and a prolongation, said prolongation separate and axially spaced apart from a gas inlet housing of the radial turbine, said gas inlet housing having an inner radius about a shaft having the central axis of rotation wherein said inner radius comprises a convex curvature in an axial direction, and said prolongation extending radially inward from the axial extension towards the central axis of rotation of the radial turbine, wherein the prolongation has a radially inner end region closest to the central axis of rotation that has a convex curvature on a side facing the first annular element, said convex curvature of the radially inner end region matching the convex curvature of the inner radius of the gas inlet housing.

2. The nozzle ring as claimed in claim 1, wherein the radially inner end region has a length $L_V$, and the convex curvature of the prolongation extends as far as $L_V$.

3. The nozzle ring as claimed in claim 2, wherein the first annular element extends radially inward toward the central axis of rotation a distance $R_{11}$, and $L_V$, which is at least 10% of the radial extent $R_{11}$ of the first annular element.

4. The nozzle ring as claimed in claim 2, wherein the first annular element extends radially inward toward the central axis of rotation a distance $R_{11}$, and $L_V$, is at least 30% of the radial extent $R_{11}$ of the first annular element.

5. The nozzle ring as claimed in claim 1, wherein the axial extension for the second annular element inserts into an axial receiving portion of the gas inlet housing of a turbine housing.

6. The nozzle ring as claimed in claim 5, wherein the axial extension comprises a receiving portion for a sealing element.

7. The nozzle ring as claimed in claim 5, wherein the axial extension comprises a receiving portion for a sealing element, wherein the receiving portion for the sealing element is arranged in a radially inner region or a radially outer region of the axial extension.

8. An exhaust turbine, comprising:
a turbine housing having a gas inlet housing,
a radial gas inflow duct arranged in the gas inlet housing, and
a nozzle ring arranged in the radial gas inflow duct, the nozzle ring comprising a first annular element, a second annular element, and a plurality of guide vanes which are arranged between the first annular element and the second annular element, wherein an intermediate space between the first annular element and the second annular element provides a flow duct, wherein the first annular element defines the flow duct on a bearing-housing side and the second annular element defines the flow duct on a turbine-housing side, wherein the second annular element comprises an axial extension that extends axially parallel to a central axis of rotation of the exhaust turbine and a prolongation, said prolongation separate and axially spaced apart from the gas inlet housing of the exhaust turbine, said gas inlet housing having an inner radius about a shaft having the central axis of rotation wherein said inner radius comprises a convex curvature in an axial direction, and said prolongation extending radially inward from the axial extension towards the central axis of rotation of the exhaust turbine, wherein the prolongation has a radially inner end region closest to the central axis of rotation that has a convex curvature on a side facing the first annular element, said convex curvature of the radially inner end region matching the convex curvature of the inner radius of the gas inlet housing.

9. The exhaust turbine as claimed in claim 8, wherein there is an axial gap S1 between a side of the prolongation of the second annular element which faces away from the first annular element and an opposite side of the gas inlet housing.

10. The exhaust turbine as claimed in claim 8, wherein the axial extension for the second annular element inserts into an axial receiving portion of the gas inlet housing of the turbine housing, wherein the axial extension is arranged at least in part in an axial receiving portion of the gas inlet housing.

11. The exhaust turbine as claimed in claim 10, wherein the axial extension comprises a receiving portion for a sealing element, and wherein, in the receiving portion for the sealing element, a sealing element is arranged which provides a seal between the nozzle ring and the gas inlet housing.

12. The exhaust turbine as claimed in claim 11, wherein the sealing element is a metal lamellar sealing ring.

13. The exhaust turbine as claimed in claim 10, wherein the axial receiving portion of the gas inlet housing comprises a bevel or a rounding.

14. The exhaust turbine as claimed in claim 13, wherein the bevel or the rounding is arranged in a radially inner region of the axial receiving portion.

15. The exhaust turbine as claimed in claim 10, wherein there is an axial gap S2 between an end face of the axial extension and the axial receiving portion of the gas inlet housing.

16. The exhaust turbine as claimed in claim 10, wherein there is a radial gap S3 between a radially outer side of the axial extension and the axial receiving portion of the gas inlet housing.

17. The exhaust turbine as claimed in claim 8, wherein the exhaust turbine is a radial turbine.

18. A turbocharger comprising an exhaust turbine, the exhaust turbine comprising:
a turbine housing having a gas inlet housing,
a radial gas inflow duct arranged in the gas inlet housing, and
a nozzle ring arranged in the radial gas inflow duct, the nozzle ring comprising a first annular element, a second annular element, and a plurality of guide vanes which are arranged between the first annular element and the second annular element, wherein an intermediate space between the first annular element and the second annular element provides a flow duct, wherein the first annular element defines the flow duct on a bearing-housing side and the second annular element defines the flow duct on a turbine-housing side, wherein the second annular element comprises an axial extension that extends axially parallel to a central axis of rotation of the exhaust turbine and a prolongation, said prolongation separate and axially spaced apart from the gas inlet housing of the exhaust turbine, said gas inlet housing having an inner radius about a shaft having the central axis of rotation wherein said inner radius comprises a convex curvature in an axial direction, and said prolongation extending radially inward from the axial extension towards the central axis of rotation of the exhaust turbine, wherein the prolongation has a radially inner end region closest to the central axis of rotation that has a convex curvature on a side facing the first annular element, said convex curvature of the radially inner end region matching the convex curvature of the inner radius of the gas inlet housing.

* * * * *